United States Patent
Ooyama et al.

(10) Patent No.: US 10,527,353 B2
(45) Date of Patent: Jan. 7, 2020

(54) WORKPIECE TRANSFER APPARATUS FOR FURNACE

(71) Applicant: TOYODA IRON WORKS CO., LTD., Toyota-shi, Aichi (JP)

(72) Inventors: Yoshinori Ooyama, Toyota (JP); Kentaroh Uehara, Toyota (JP)

(73) Assignee: TOYODA IRON WORKS CO., LTD., Toyota-shi (JP)

( * ) Notice: Subject to any disclaimer, the term of this patent is extended or adjusted under 35 U.S.C. 154(b) by 44 days.

(21) Appl. No.: 15/756,425

(22) PCT Filed: Aug. 29, 2016

(86) PCT No.: PCT/JP2016/075143
§ 371 (c)(1),
(2) Date: Feb. 28, 2018

(87) PCT Pub. No.: WO2017/038740
PCT Pub. Date: Mar. 9, 2017

(65) Prior Publication Data
US 2018/0245849 A1    Aug. 30, 2018

(30) Foreign Application Priority Data
Aug. 31, 2015 (JP) .................. 2015-171129

(51) Int. Cl.
*G06F 19/00* (2018.01)
*F27D 3/06* (2006.01)
(Continued)

(52) U.S. Cl.
CPC .............. *F27D 3/06* (2013.01); *B25J 11/00* (2013.01); *B65G 1/00* (2013.01); *G05B 19/4189* (2013.01); *G05B 2219/50362* (2013.01)

(58) Field of Classification Search
CPC ... F27D 3/06; B25J 11/00; B25J 13/08; G05B 19/4189; G05B 2219/50362; B65G 1/00
See application file for complete search history.

(56) References Cited

U.S. PATENT DOCUMENTS 3,628,358 A * 12/1971 Fapiano .................. B21B 37/16
72/10.4
8,395,136 B2 * 3/2013 Kondoh ............ H01L 21/67742
250/221
(Continued)

FOREIGN PATENT DOCUMENTS

JP    H6-246658 A     9/1994
JP    2008-291284 A   12/2008
(Continued)

OTHER PUBLICATIONS

May 22, 2018 Office Action issued in Japanese Patent Application No. 2015-171129.
(Continued)

*Primary Examiner* — Michael D Masinick
(74) *Attorney, Agent, or Firm* — Oliff PLC

(57) ABSTRACT

A workpiece transfer apparatus for a furnace includes a carrier having access to a furnace and carrying a workpiece placed thereon, a controller for controlling movement of the carrier, the controller for determining an amount of deformation of the carrier by heat of the furnace, and the controller for determining an adjustment to the attitude of the carrier on the basis of the amount of deformation of the carrier, wherein when handing over the workpiece for a next process tool, the carrier is moved into an adjusted attitude.

5 Claims, 8 Drawing Sheets

(51) Int. Cl.
*B65G 1/00* (2006.01)
*B25J 11/00* (2006.01)
*G05B 19/418* (2006.01)

(56) References Cited

U.S. PATENT DOCUMENTS

| | | | | |
|---|---|---|---|---|
| 9,343,350 B2* | 5/2016 | Arai | ................ | H01L 21/68707 |
| 9,418,881 B2* | 8/2016 | Sugiura | ............ | H01L 21/67109 |
| 2009/0087807 A1* | 4/2009 | Yu | ...................... | F27B 17/0025 |
| | | | | 432/121 |
| 2009/0101472 A1* | 4/2009 | Hishiya | ............ | H01L 21/67303 |
| | | | | 198/474.1 |
| 2010/0172720 A1* | 7/2010 | Kondoh | ........... | H01L 21/67742 |
| | | | | 414/217 |
| 2013/0180448 A1* | 7/2013 | Sakaue | ............ | H01L 21/67739 |
| | | | | 118/696 |

FOREIGN PATENT DOCUMENTS

| | | |
|---|---|---|
| JP | 2008-305989 A | 12/2008 |
| JP | 2012-084637 A | 4/2012 |
| JP | 2013-42112 A | 2/2013 |
| JP | 2013-146833 A | 8/2013 |
| JP | 2014-077567 A | 5/2014 |

OTHER PUBLICATIONS

Oct. 11, 2016 Search Report issued in International Patent Application No. PCT/JP2016/075143.
Oct. 11, 2016 Written Opinion issued in International Patent Application No. PCT/JP2016/075143.
Dec. 18, 2018 Office Action issued in Japanese Patent Application No. 2015-171129.
Dec. 19, 2018 Extended European Search Report issued in European Patent Application No. 16841772.3.

* cited by examiner

WORKPIECE TRANSFER APPARATUS FOR FURNACE

FIELD OF DISCLOSURE

The present disclosure relates to a workpiece transfer apparatus for a furnace.

DESCRIPTION OF THE RELATED ART

Manufacturing processes involving heat treatment in a furnace require the process of putting a workpiece (i.e. material to be processed) into the furnace from the preceding process tool and taking the workpiece out of the furnace to the next process tool. Related techniques are described, for example, in the following patent documents: Japanese Patent Application Publication Nos. 2014-077567, 2008-291284 and 2012-084637. Such a transfer operation can be carried out, for example, by using a robot with a fork attached at the end of the arm for holding a workpiece on it, and inserting the fork into the furnace or pulling it out from the furnace. The workpiece placed on the fork is moved between process tools including a furnace.

SUMMARY OF THE DISCLOSURE

In the workpiece transfer operation as described above, since the fork puts the heated workpiece in the high-temperature atmosphere inside the furnace, the upper surface side of the fork is particularly expanded by heat, and as a result, as shown in FIG. 9, it tends to deflect. Furthermore, the deflection of the fork can change from moment to moment due to thermal conduction within the fork material. For example, the distal end of a fork is deflected, as heat transfers from the upper surface to the lower surface of the fork during repeated conveyance of hot workpieces, the lower side also expands, and deflect back to be almost linear again.

When the fork deforms in this manner, the position of the workpiece placed on it also changes, so there is a possibility that the handover of the workpiece to the next tool may fail as illustrated in FIG. 9 on the right side of the middle row. For example, if a workpiece does not come to a desired position at the time of handover, the grasping device that takes the workpiece may not be able to successfully grasp the workpiece. Further, greater deformation of the fork may lead to the problem of the fork coming into contact with the furnace or other tool components, thereby damaging the fork and the tool. When such a situation occurs, the production line needs to be stopped, and the workers need to deal with it, resulting in reduced efficiency of the manufacturing process. However, the techniques disclosed in the above-mentioned patent documents have not addressed these problems.

The present invention in one aspect provides a workpiece transfer apparatus for a furnace including a carrier having access to a furnace and carrying a workpiece placed thereon, a controller controlling movement of the carrier, the controller determining an amount of deformation of the carrier by heat of the furnace, and the controller determining an adjustment to the attitude of the carrier on the basis of the amount of deformation of the carrier, wherein when handing over the workpiece for a next process tool, the carrier is moved into an adjusted attitude.

In some embodiments, a droop amount of a distal end of the carrier is determined, and at least one of a height and an angle of a placement surface of the carrier is adjusted.

In some embodiments, the apparatus further include a robot having an arm to which the carrier is attached, and a sensor detecting an arrival of part of the carrier at a specific position, wherein the amount of deformation of the carrier is determined on the basis of the attitude of the carrier at a time when the carrier is detected by the sensor.

In some embodiments, the amount of deformation of the carrier is determined and the attitude is adjusted every time a workpiece is taken out of the furnace by the carrier.

In some embodiments, the carrier is detected by the sensor after the workpiece is handed over for the next process tool.

In some embodiments of the present invention, when the carrier is deformed by holding heated hot workpieces, the amount of deformation is determined and the attitude of the carrier is adjusted on the basis of the deformation. Therefore, an appropriate attitude is achieved when handing over the workpiece to the next process tool, thereby preventing failure of handover. In addition, this makes the carrier more unlikely to collide with furnace components when being inserted in the furnace to introduce and remove the workpiece, thereby preventing damage to the carrier and the furnace.

DETAILED DESCRIPTION OF THE INVENTION

Embodiments of the present invention will be described below with reference to the drawings.

Embodiments of the present invention relates to a workpiece transfer apparatus of the present invention is suitable for putting workpieces W into a furnace 10 or taking out the workpieces W from the furnace 10. The furnace 10 has at least one heat source (or heater) 20 inside the furnace walls, and heats workpieces by the heat radiated from the heat source and/or by the atmosphere in which the temperature is elevated by the heat from the heat source. The heat source(s) may be of any type, including a far-infrared heater.

The furnace 10 may be used for various heat treatments at any temperature and for any duration. Further, various processes can be performed continuously before and after the heat treatment in the furnace. In an example, heat treatment in a furnace may be performed, for example, at a temperature of about 700° C. or more for about one minute or more. In the case of heat treatment under such conditions, the temperature of the workpieces is maintained at a considerably high temperature after it is taken out from the furnace. The hot metal workpieces softened by the heat treatment can be subjected to hot press forming (also called hot pressing or hot stamping) in which it is placed between dies and processed into a desired shape by pressure.

The workpiece may be, for example, a high tensile strength steel plate. The dies may press the workpiece to trim it to a desired shape. Hot press forming can be used to manufacture various structural parts of an automobile body, such as A-pillars, B-pillars and bumper reinforcements.

Figure 1:
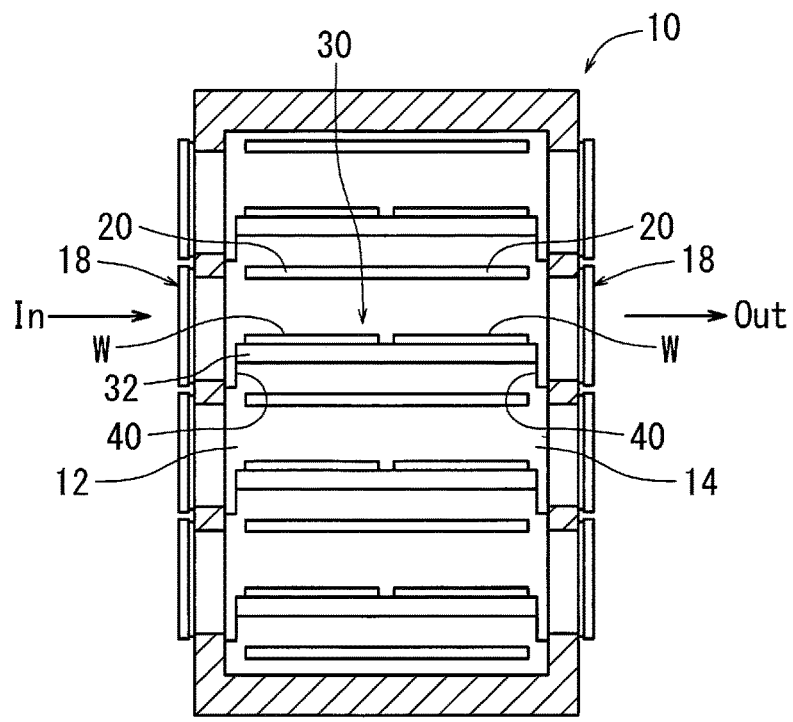
FIG. 1 is a front view of a furnace.

The furnace may be a simple furnace having a single heating chamber or a multistage furnace 10 as shown in FIG. 1. The structure of such a multistage furnace may configured to have a plurality of chambers simply stacked up, each with a heat source, or, as shown in FIG. 1, configured to have one large chamber divided into compartments and heated by one or more heat sources 20.

Each heating compartment in the furnace, as shown in FIG. 1, is provided with a stage 30 for placing workpieces W to be heat treated. Opposite furnace walls have a workpiece inlet 12 and an outlet 14 for each heating compartment. Shutters 18 are provided for each of the inlet 12 and the outlet 14. At least one layer of heat insulating material is lined over the furnace walls and the inner surfaces of the shutters so that when the shutter is closed, the space in the furnace thermally isolated from the outside. During the heat treatment, the shutters 18 are typically opened only when inserting and removing workpieces.

Figure 2:
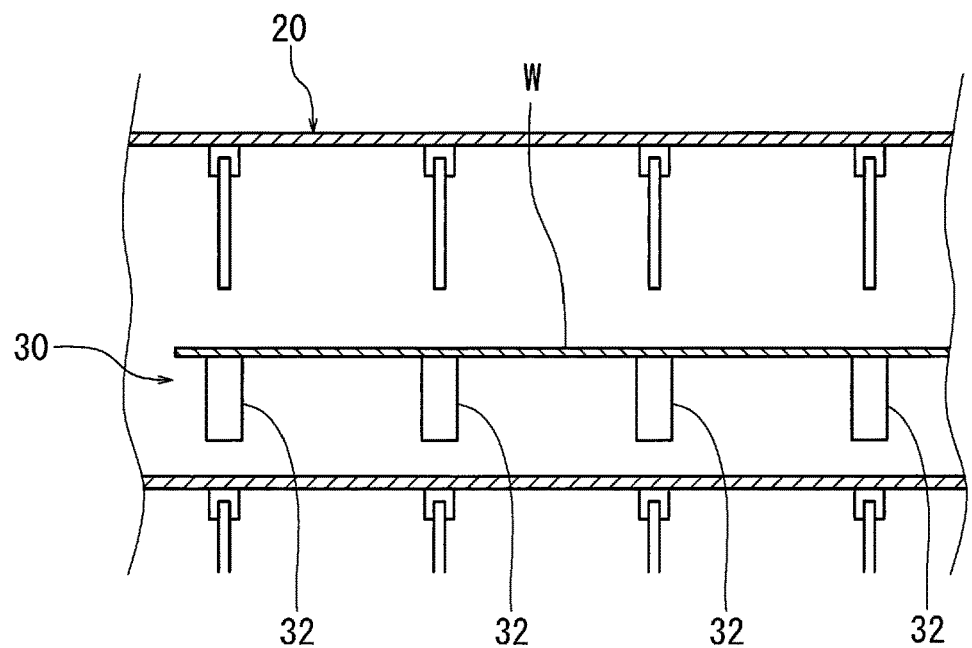
FIG. 2 is a cross-sectional view of a workpiece stage in a furnace.

As shown in FIG. 2, each stage 30 is made, for example, of a parallel arrangement of bars 32 to hold the workpiece W lying across two or more of the bars 32. Each bar 32 may be formed of, for example, a metal square tube. Each bar 32 is secured at both ends to the furnace walls through mounting structures including a base 40.

Figure 3:
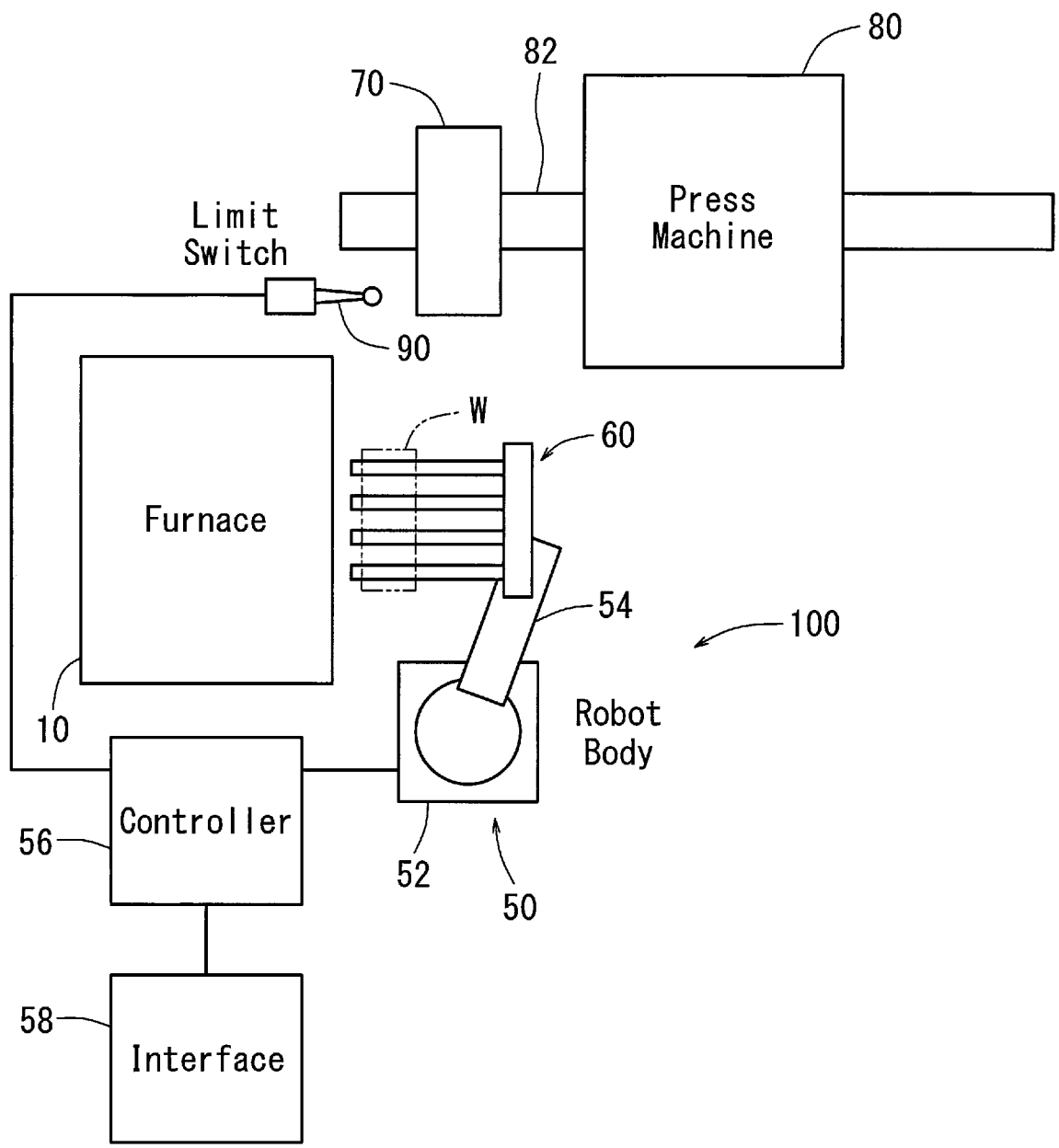
FIG. 3 is a schematic diagram showing a general configuration of a transfer apparatus according to an embodiment of the present invention.

As shown in FIG. 3, the transfer apparatus 100 in one embodiment of the present invention includes a general-purpose industrial transfer robot 50 in combination with a sensor detecting the arrival of an object at a specific position, such as a limit switch or a proximity sensor 90.

The robot 50 includes, for example, an arm 54 including a plurality of joints and capable of multi-axis rotational operations. To the end of the arm 54, or hand, of the robot 50, there is attached a carrier 60 for holding and carrying workpieces W. The sensor 90 is secured to a location, such as the outer surface of the furnace wall, where there is no relative movement with respect to the base of the robot 50. As will be described later, the sensor 90 is used for determining the deflection of the carrier 60 due to hot workpieces W placed on the carrier 60.

As shown in FIG. 3, in addition to the working body (or manipulator) 52, the transfer robot 50 typically includes a controller 56 controlling various operations of the body 52 and a programmable user interface (or terminal) 58. The controller 56 is operably connected to at least the robot body 52, the interface 58 and the sensor 90, but it can also be connected to the furnace or the press machine in order to coordinate operations.

The controller 56 always recognizes the current attitude of the robot body 52 in terms of the angle and coordinates of each joint. In addition, the controller 56 realizes desired attitudes of the carrier 60 by sending operational signals to actuators of the body 52 in accordance with the code programmed by the user.

Figure 4:
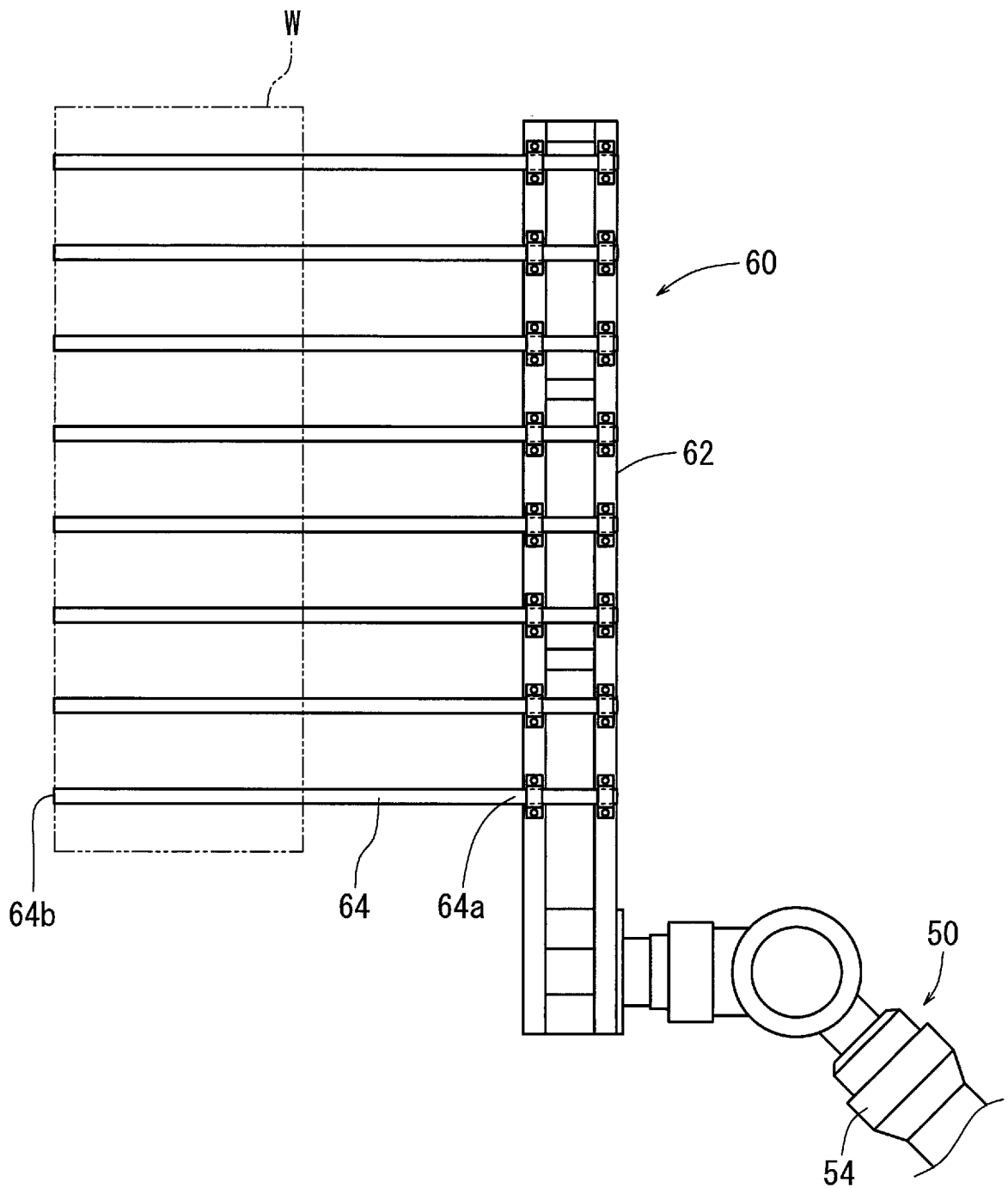
FIG. 4 is a top view of a fork for carrying a workpiece placed thereon.

As shown in FIG. 4, the carrier may be, for example, a branched fork 60 formed of a parallel arrangement of bars 64. In the embodiment shown in the figure, the bars 64 extend in parallel toward one side from the elongate base member 62, at an end of which the fork 60 is attached to the robot arm 54. The bars 64 constituting the fork 60 may be metal square tubes.

When such a fork 60 is used to put a workpiece W into the furnace 10, the fork 60 with the workpiece W on it is inserted into the furnace and then lowered from above the stage 30. The workpiece can then be transferred onto the stage 30 while allowing the fork 60 to pass down through the bars 32 of the stage 30.

The unloaded fork 60 can then be pulled out from the stage 30. Conversely, to remove the workpiece W from the furnace 10, the fork 60 is inserted between the bars 32 constituting the stage 30 and then lifted so that the workpiece is held on the fork 60. The fork 60 is then drawn out from the furnace to take out the workpiece.

Typically, separate transfer apparatuses are used for putting workpieces into and out of the multistage furnace 10. However, for some purposes, one transfer apparatus can be used for both these purposes. While the transfer apparatus of the disclosed herein can be applied to both inserting and removing workpieces, preferred embodiments applied to removal (or extracting) from the furnace will be described below.

Figure 5:
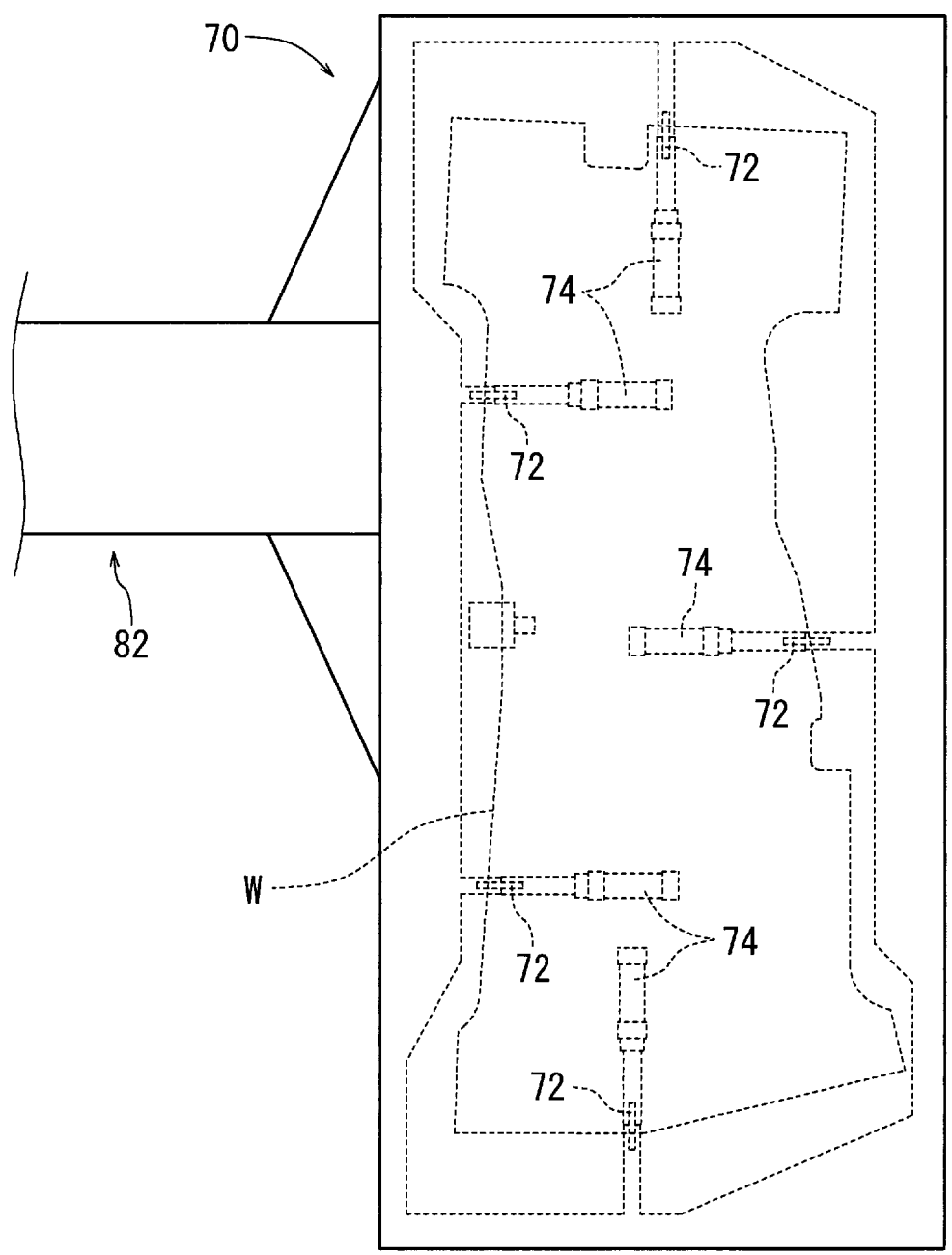
FIG. 5 is a top view of a grasping device for picking up a workpiece placed on a fork.
Figure 6:
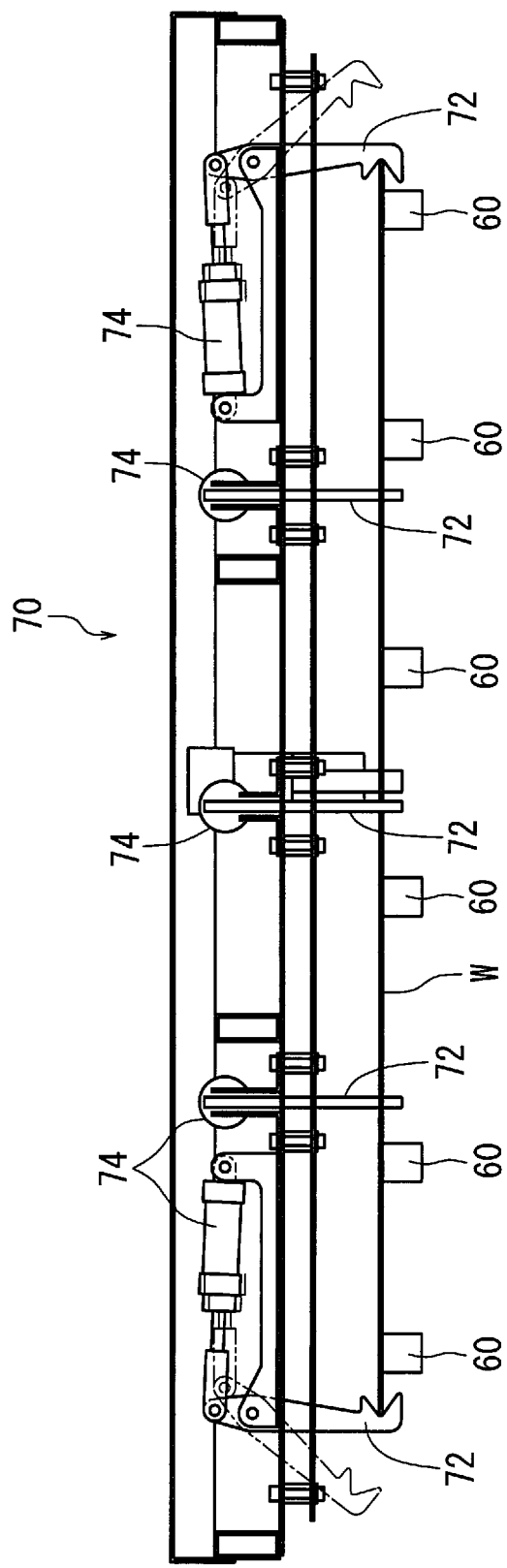
FIG. 6 is a side view of a grasping device taking a workpiece from a fork.
Figure 7:
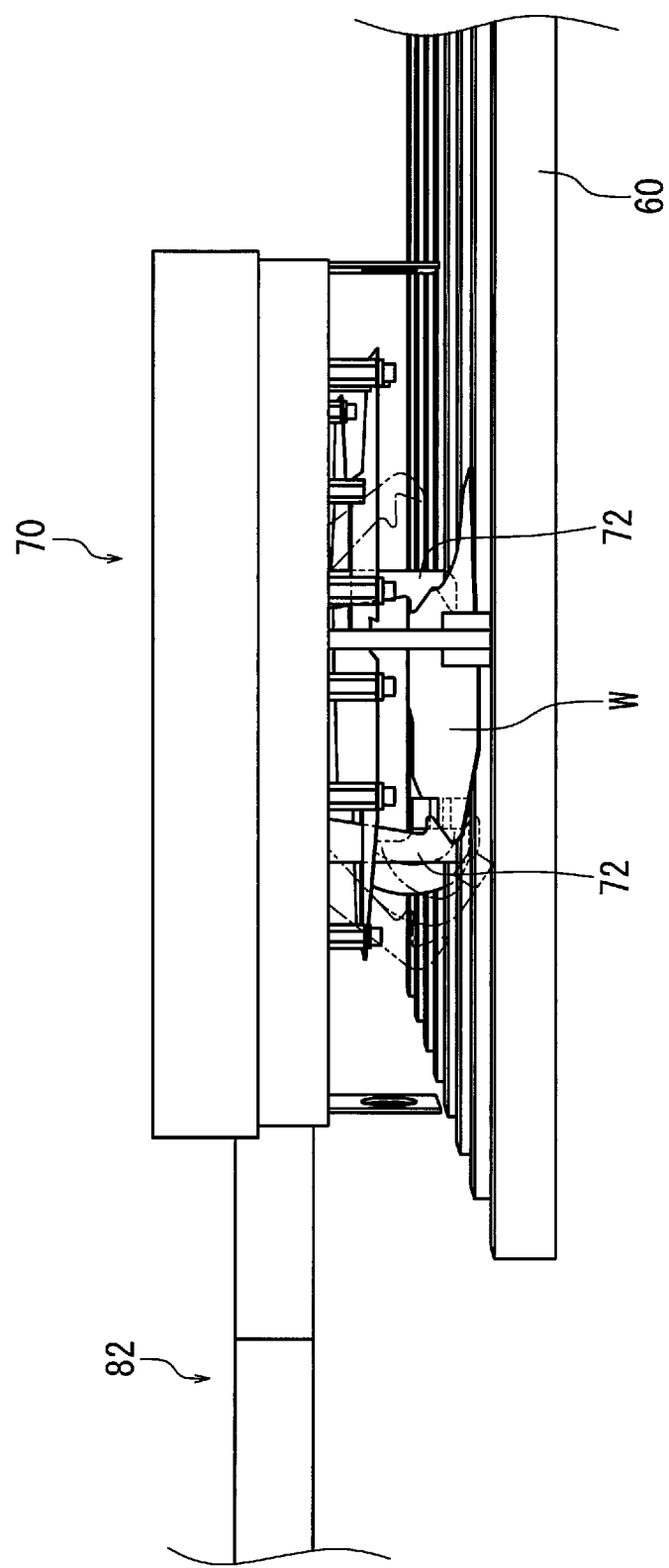
FIG. 7 is a perspective view of a grasping device taking a workpiece from a fork, as viewed obliquely from above.

FIG. 5 shows a grasping device 70 which takes the workpiece W from the fork, and FIGS. 6 and 7 both show a fork 60 handing over a workpiece W to the grasping device 70. The workpiece W taken out of the furnace by the fork 60 is conveyed to the next process tool such as a press machine 80 by the grasping device 70. The grasping device 70 is attached to the end of a loader 82 which is attached to the press machine 80 and moves vertically and horizontally.

The grasping device 70 may include engaging elements 72 each having V-profiled groove which can be engaged with the edges of a workpiece such as a steel sheet. Each engaging element 72 is attached to the frame of the grasping device 70 rotatably about a pivot, and is pivoted by an actuator 74 provided for each engaging element 72. Engagement of these engaging elements 72 with the periphery of the workpiece W allows the firm grasping of a workpiece W. The loader 82 is moved vertically and horizontally with the grasping device 70 holding a workpiece W and transfers the workpiece W onto a die in the press machine 80. For placing the workpiece W in position on the die, it is important that the grasping device 70 grasp the workpiece W with a good positional accuracy.

Figure 8:
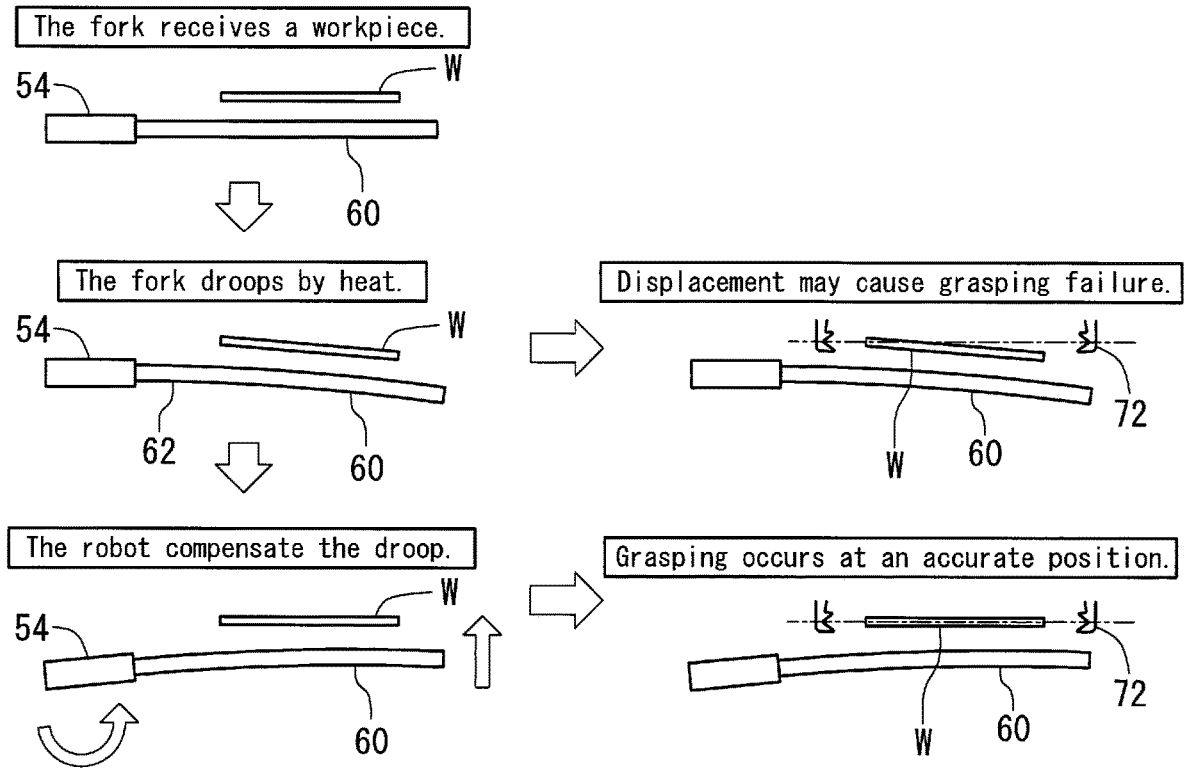
FIG. 8 is an illustration comparing a fork with no compensation for the drooping and a fork with the drooping compensated according to an embodiment of the present invention.

As mentioned in the beginning and as shown in FIG. 8, since the fork 60 carries the workpiece heated in the furnace during the carrying operation, the fork 60, particularly on its upper side, is expanded by heat, and as a result, the distal end of the fork 60 tends to deflect downward. If the fork 60 is deflected, the grasping of the workpiece may fail or be incomplete because the fork does not come into place when handing over the workpiece to the grasping device 70. In some embodiments of the present invention, the controller 56 of the transfer robot adjusts the attitude of the fork 60 at the time of workpiece handover on the basis of the information obtained from the sensor 90 in a manner described below.

Figure 10:
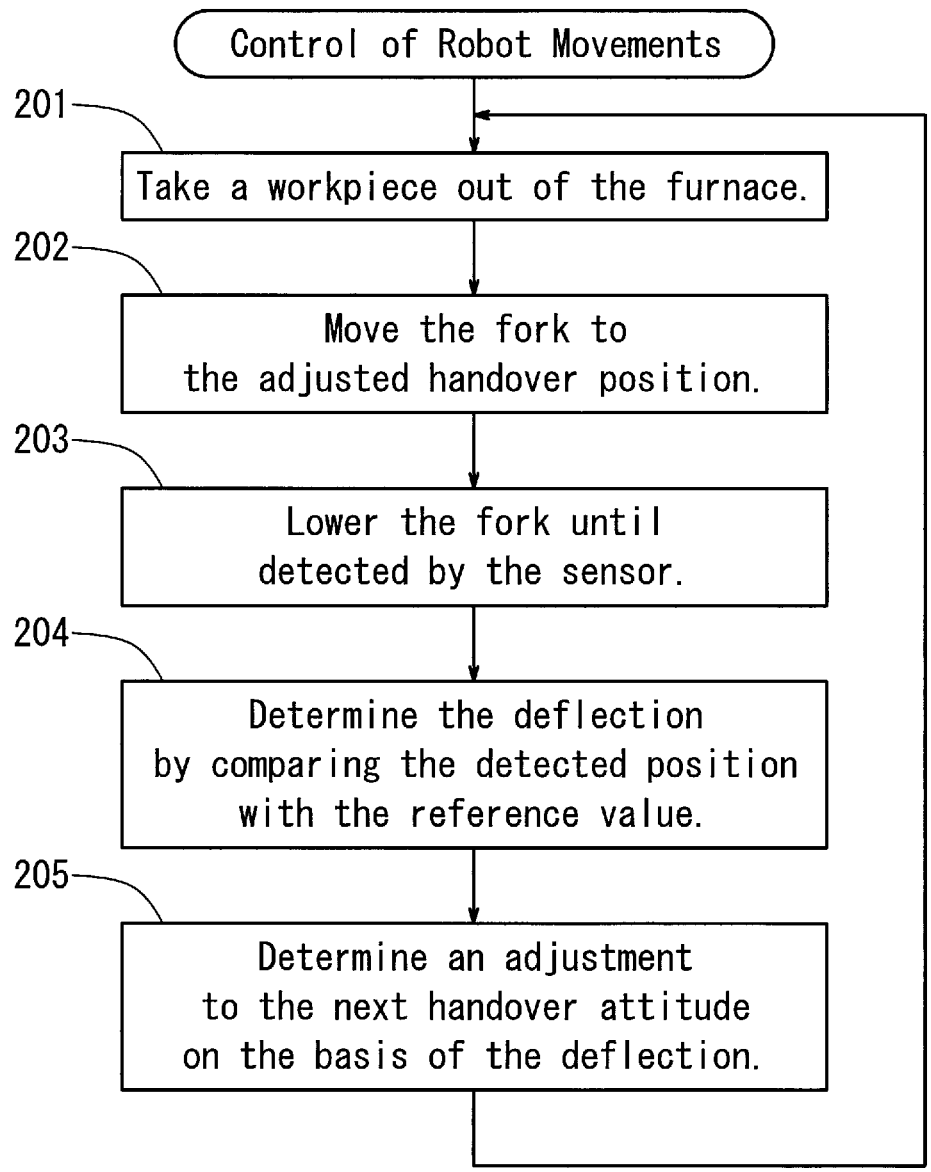
FIG. 10 is a flow chart for the control of movement of a fork attached to a robot arm according to an embodiment of the present invention.

FIG. 10 shows a flow of control of the robot body 52 by the controller 56. After taking out the workpiece W from the furnace 10 in step 201, the fork 60 is moved to the position for handover to the grasping device 70 in step 202. The specific path of this movement varies depending on which stage of the multistage furnace to take out from, but it may be necessary to move quickly because the workpiece W must be handed over to the press machine 80 while hot.

When the workpiece W is removed from the fork 60 by the grasping device 70, the fork 60 is lowered until it is detected by a sensor 90 such as a limit switch in step 203 in FIG. 10.

Figure 9:
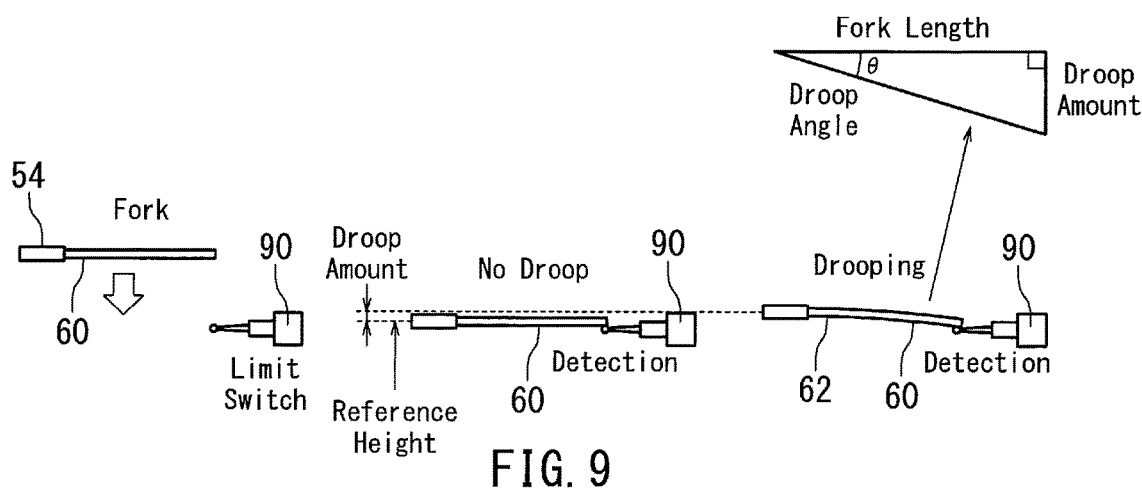
FIG. 9 is an illustration of the principle of determining the amount of deformation of a fork deformed by heat according to an embodiment of the present invention.

In an example, as shown in FIG. 9, the limit switch 90 is installed in such an orientation as to detect a downward input (i.e. contact) in the operating lever, and the fork 60 is lowered straight down along a vertical path to ensure that the distal end of the fork makes contact with the operating lever. When the fork 60 is not deflected, the fork 60 is lowered and detected at a certain point of the descent by the limit switch 90. The height of the fork 60 at this time is stored as a reference value in the controller 56 beforehand.

On the other hand, when the distal end of the fork 60 is deflected downward by heat, the time at which it is detected is advanced by a corresponding time, so the height of the fork 60 on detection is higher than the reference value. The controller 56 can then calculate the height difference from this reference value to determine the downward displacement of the fork end (in step 204).

Utilizing the attitude recognition function of the robot in combination with the limit switch 90 in the manner described above allows the determination of the fork deformation to be carried out inexpensively, without the need to provide an expensive displacement sensor or to use complicated controls. However, it is also possible, in some embodiments, to directly measure the displacement of the fork end with a sensor.

When the fork 60 is deflected, the workpiece placement surface is inclined. The upper right part of FIG. 9 illustrates a model for calculating the droop angle (the inclination angle relative to the horizontal) of the placement surface from the deflection. The deflected portion of the fork due to heat will not be necessarily linear, but can be regarded as linear since the drooping (e.g. about 10 mm) of the distal end of the fork 60 will be much smaller than the length of the fork 60.

As obvious from the figure, this model allows for calculating the droop angle of the placement surface in a simple manner from the reference length of the placement surface of the fork 60 (e.g. the length of the bar 64 from the base 64*a* to the distal end 64*b* shown in FIG. 4) and the droop amount of the distal end, simply by applying trigonometry. However, this method is merely an example, and it is possible to estimate the droop angle using other models.

As shown in FIG. 10, an adjustment to the fork attitude is determined on the basis of the determined droop amount and droop angle (step 205), and at the next handover, the operation of the robot arm 54 is set so as to be the adjusted attitude (Step 202). The attitude of the fork 60 may be considered in terms of height and angle (or direction).

For example, when the droop angle of the fork 60 is determined to be 5 degrees, the adjustment may be made by inclining the angle of the fork 60 by 5 degrees in the opposite direction from the original orientation. Since the starting point of the deflection in the fork 60 (the left vertex of the triangle in FIG. 9) is different from any joint of the robot 50, it may be necessary to adjust not only the angle but also the height of the fork. Therefore, the specific calculation of adjustments depends on the design of the carrier including the fork 60.

The transfer cycle described above is carried out in a short time of about 10 to several tens of seconds per cycle, for example. The deflection of the fork 60 can change from moment to moment due to the heat conduction within the fork material. However, using the method described above the workpiece handover can always be realized in the optimum attitude by following the changing deflection, although there is a time lag of almost one cycle from the detection to the actual application of the adjustment.

The flow of control shown in FIG. 10 is merely an example, and other flows are possible. For example, when it is not necessary to hand over the workpiece W from the furnace to the next process so soon, the sensor and the adjustment may be determined before the handover so that the adjustment is applied within the same cycle.

Although some embodiments of the present invention have been described above with reference to specific configurations, it is obvious that those skilled in the art can make various substitutions, improvements and/or modifications without departing from the spirit of the present invention.

That is, the embodiments of the present invention are intended to include all substitutions, improvements, and modifications that meet the object and the spirit of the appended claims. Embodiments of the present invention can be implemented in various configurations without being limited to specific ones.

The invention claimed is:

1. A workpiece transfer apparatus for a furnace, comprising:
    a robot comprising an arm and a controller,
    a carrier attached to the arm and having a placement surface for carrying a workpiece into and/or out of a furnace, and
    a sensor for detecting an arrival of an object at a specific position, the sensor being coupled to the controller,
    the controller being configured to:
        i) cause the robot to move the carrier so that the sensor detects an arrival of the distal end of the carrier at the specific position,
        ii) determine a droop amount of the distal end of the carrier heated by the furnace based on a position of a base of the carrier at the time when the sensor detects the arrival of the distal end of the carrier at the specific position,
        iii) determine an adjusted handover position of the carrier based on the determined droop amount of the carrier, the adjusted handover position including at least one of an adjusted height and an adjusted angle of the placement surface of the carrier, and
        iv) cause the robot to move the carrier to the adjusted handover position for handover of the workpiece.

2. The transfer apparatus according to claim 1, wherein:
    the controller is configured to determine the droop amount and the adjusted position every time the carrier takes a workpiece out of the furnace.

3. The transfer apparatus according to claim 1, wherein:
    the controller is configured to perform the step i) after a handover of the workpiece occurs.

4. The transfer apparatus according to claim 1, wherein:
    the controller is configured to store a reference position of the base of the carrier at the time when the distal end of the carrier is detected by the sensor, where the distal end of the carrier is not drooped, and
    the step ii) of determining the droop amount comprises determining the droop amount based on a difference between the reference position of the base of the carrier and the position of the base of the carrier at the time when the sensor detects the arrival of the distal end of the carrier at the specific position.

5. The transfer apparatus according to claim 1, wherein:
the step iii) of determining the adjusted handover position comprises determining a droop angle of the placement surface of the carrier based on the determined droop amount.

\* \* \* \* \*